(12) United States Patent
Chiaruzzi et al.

(10) Patent No.: US 7,474,311 B2
(45) Date of Patent: Jan. 6, 2009

(54) DEVICE AND METHOD FOR PROCESSING VIDEO AND GRAPHICS DATA

(75) Inventors: Emmanuel Chiaruzzi, Tullins (FR); Didier Aladenise, Echirolles (FR); Mark Vos, Grenoble (FR); Alastair Walker, Tullins (FR); Lydie Gillet, Grenoble (FR); Michel Terrat, Saint-Egreve (FR)

(73) Assignee: STMicroelectronics SA, Montrouge (FR)

( * ) Notice: Subject to any disclaimer, the term of this patent is extended or adjusted under 35 U.S.C. 154(b) by 552 days.

(21) Appl. No.: 10/924,748

(22) Filed: Aug. 24, 2004

(65) Prior Publication Data
US 2005/0078119 A1    Apr. 14, 2005

(30) Foreign Application Priority Data
Sep. 8, 2003    (FR)    ................................. 03 10566

(51) Int. Cl.
*G06T 15/00* (2006.01)

(52) U.S. Cl. ..................... 345/501; 345/419; 345/541; 348/512

(58) Field of Classification Search ................ 345/541, 345/419, 547, 501; 348/512, 441, 461
See application file for complete search history.

(56) References Cited

U.S. PATENT DOCUMENTS

| | | | |
|---|---|---|---|
| 5,889,949 A | 3/1999 | Charles | ................ 395/200.44 |
| 6,311,204 B1 * | 10/2001 | Mills | .......................... 718/100 |
| 7,071,944 B2 * | 7/2006 | MacInnis et al. | ............ 345/505 |
| 7,227,582 B2 * | 6/2007 | MacInnis et al. | ............ 348/512 |

OTHER PUBLICATIONS

Tobias, The LR33020 GraphX Processor: A Single Chip X-Terminal Controller, Intellectual Leverage, San Francisco, Feb. 24-28, 1992, Proceedings of the Computer Society International Conference, Los Alamitos, IEEE Comp. Soc. Press, vol. Conf. 37, pp. 358-363.

McCormack et al., Neon: A Single-Chip 3D Workstation Graphics Accelerator, Proceedings of the 1998 Eurographics/Siggraph Workshop on Graphics Hardware, New York, NY, vol. Workshop 2, Aug. 31, 1998, pp. 123-132.

* cited by examiner

*Primary Examiner*—Phu K Nguyen
(74) *Attorney, Agent, or Firm*—Lisa K. Jorgenson; Allen, Dyer, Doppelt, Milbrath & Gilchrist, P.A.

(57) ABSTRACT

A device for processing video and graphics data includes a component and a main random access memory containing video and graphics data. The component includes a processing unit, and a two-dimensional acceleration unit cooperating with the processing unit and the main random access memory to compose in real time images. The images include at least one video plane and at least one graphics plane, and are stored in the main random access memory. An output interface extracts the image data thus composed from the main random access memory for delivery to an image display.

34 Claims, 11 Drawing Sheets

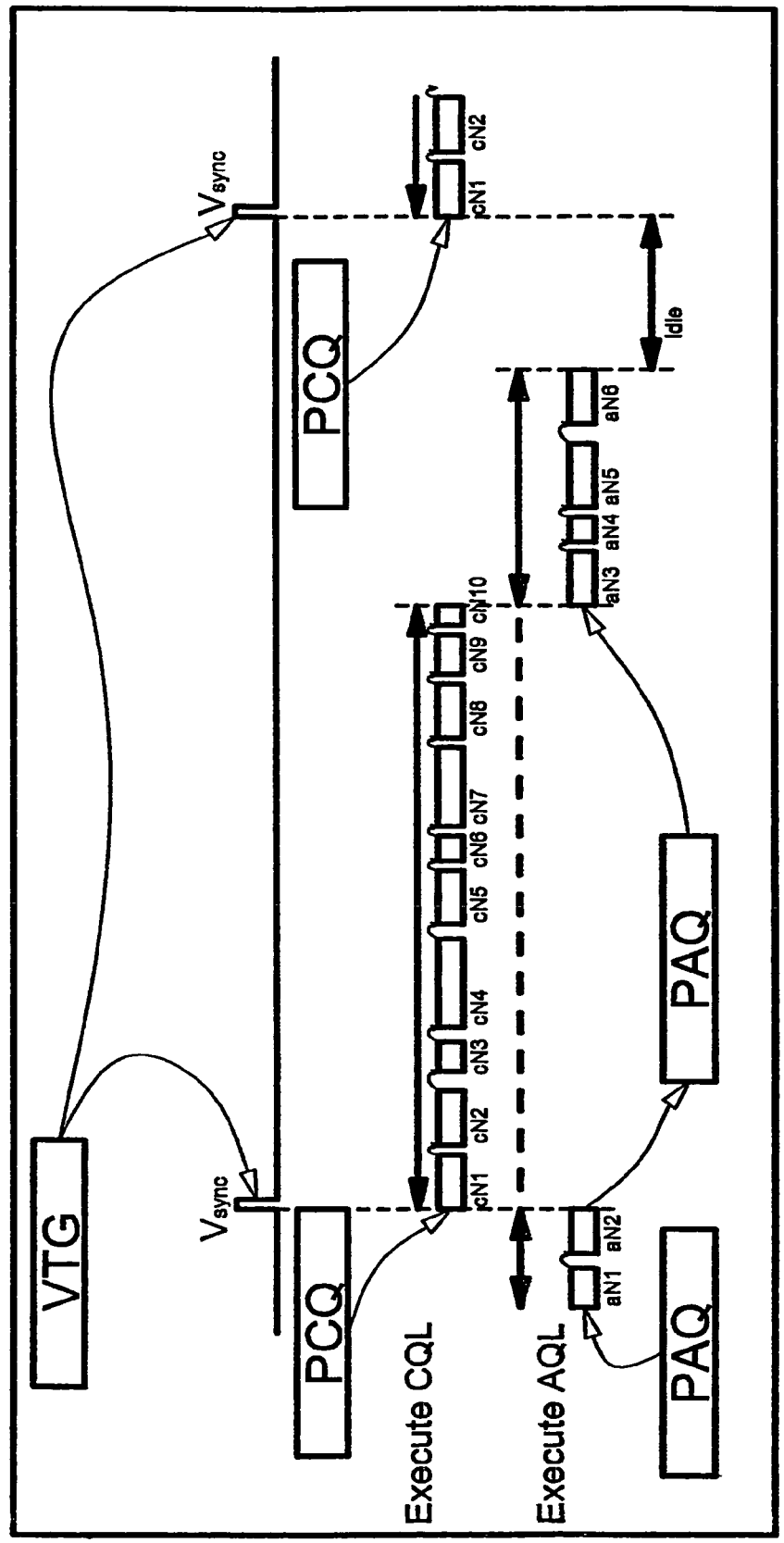

DEVICE AND METHOD FOR PROCESSING VIDEO AND GRAPHICS DATA

FIELD OF THE INVENTION

The invention relates to the processing of video and graphics data arising, for example, from digital video disks (DVDs) and from digital television transmissions. The invention advantageously applies to video decoders and to satellite decoders, i.e., set top boxes.

BACKGROUND OF THE INVENTION

At present, such systems for processing video and graphics images are focused on cost optimization. Moreover, they require high video quality, but also the use of graphics planes to display, in particular, menus on the television screens and thus to add interactivity to all the programs.

The cost of such a processing system is in part defined by the choice of external memories. Also, memories of the SDRAM type which are low cost are preferably used. Such memories offer a small bandwidth, which entails optimizing the system with respect to this small bandwidth criteria.

To remedy this bandwidth problem, but also to comply with the pixel processing constraints which, in television applications, should be performed at a frequency of 13.5 MHz and sometimes more to allow rescaling, the present systems are designed to minimize the number of pixel manipulations.

With this in mind, such video and graphics data processing systems comprise units which create the pixels and store the images thus created in the external memory. For example, such units are MPEG, JPEG decoders, microprocessors, or graphics accelerators that allow the creation of graphics objects with the aid of simple functions, such as the filling in of a rectangle, or the copying of an object, or the mixing of two objects.

Aside from these pixel creating units, the system also comprises units, for example, of the DMA type. These units will extract the pixels thus generated from the external memory, for example the SDRAM memory, and send them to a pixel compositor whose role is to compose all the planes (or layers) intended to form the image before sending it to a display device, such as a television screen, for example.

Also, each unit of the DMA type, is dedicated to a particular type of plane of the image, for example, a video plane or a graphics plane, and is optimized to extract this plane with a predetermined format.

Such an architecture is efficient in terms of bandwidth, since the manipulation of the pixels is reduced to the minimum. In fact, over the duration of a frame or an image, the video decodings and the graphics planes are effected, whereas they are accessed during the next image or frame and composed together. It therefore follows that the external memory is used once to store all the planes and once to read them before mixing or composition.

However, the arrival of new memories of the DDR/SDRAM type, for example, now makes such an architecture obsolete and expensive. Specifically, its main drawback then resides in its footprint. More precisely, depending on the number of planes used by the application, each unit of the DMA type may require processes for redimensioning, antiflicker or color conversion. Also, these processes lead to a parallelization of the resources that is extremely expensive in terms of surface area.

Moreover, the pixel compositor has to be designed to combine all the graphics planes with video planes. Such a compositor is composed of a large number of multipliers, and this also has a negative impact on the surface area.

Moreover, since an item of hardware is dedicated to each plane, once the configuration has been chosen, the integrated circuit (ASIC) is no longer flexible and any change in the specifications thus translates into a change in the hardware.

Furthermore, to avoid pixel manipulations, all the units of the DMA type operate at the television sampling frequency or at a multiple of this sampling frequency (13.5 MHz or 27 MHz). Also, to avoid non-delivery of pixels to the television screen, it is then advisable to take account of a large number of real-time constraints, which leads to the system being complicated further.

SUMMARY OF THE INVENTION

An object of the invention is to reduce the surface area of a system for processing video and graphics data, while not being limited by the hardware with respect to the number of planes to be composed.

Another object of the invention is also to offer no limitations on the number of video planes that can be displayed, and on the resealing factors for the graphics planes.

Yet another object of the invention is to no longer impose constraints on the location of graphics viewports on the image. More precisely, this object is to allow the insertion of several graphics viewports the same video line.

The invention therefore proposes a device for processing video and graphics data comprising a component and a main random access memory which is able to contain video and graphics data. The component comprises a processing unit, a two-dimensional acceleration unit able to cooperate with the processing unit and the main memory so as to compose in real time images comprising at least one video plane and eventually at least one graphics plane and to store them in the main memory. An output interface extracts the image data thus composed from the main memory for delivery to an image display.

Thus, the invention provides for the use of a two-dimensional acceleration unit, that is, a two-dimensional graphics accelerator which up to now was generally used to create graphics objects. The two-dimensional acceleration unit composes in real time images comprising at least one graphics plane and eventually at least one video plane. For example, certain images may contain only a single video plane, whereas others may comprise graphics planes and video planes.

The main random access memory may be a memory external to the component. The invention, the component may comprise a video synchronization generator for delivering vertical synchronization signals at regular intervals. Also, during a first interval, the processing unit may perform a scene analysis of the image to be displayed and generate a list of composition instructions for the image.

During a second interval, following the first, the acceleration unit may compose the image to be displayed in regards to the composition instructions and stores it in the main memory. During a third interval, following the second, the output interface may extract the image data of the image to be displayed.

The component may advantageously comprise an input interface for receiving coded video data, and a video decoding unit co-operating with the processing unit and the main memory. In this case, the video decoding unit advantageously performs the decoding of the video data and stores them in the main memory during the first interval.

Although the processing unit can generate composition instructions for the entire image, the invention is particularly advantageous in the sense that the processing unit can generate composition instructions for certain parts only of the image, in particular, when other parts of the image are not modified with respect to the previous images.

The image to be composed may comprise more than two planes, and the acceleration unit may compose the image as several successive elementary compositions, with each elementary composition implementing two intermediate planes. An intermediate plane is a plane of the image or a plane resulting from at least one previous elementary composition.

Stated otherwise, according to the invention, the two-dimensional acceleration unit may compose the various planes of the image in pairs, for example, in a buffer memory area (or frame buffer) of the main random access memory. Also, once composed, this buffer memory area may be accessed by the output interface which is then composed of a single unit, of the DMA type for example, to be sent to the display unit.

According to an embodiment of the invention, the acceleration unit may comprise three inputs, three internal processing paths respectively connected to the three inputs, and a controllable composition unit connected to the output of the three internal processing paths. A fourth internal processing path may be connected to the output of the composition unit, and an output may be connected to the output of the fourth path.

First and second internal processing paths from among the three internal processing paths are advantageously equipped with horizontal and vertical filtering, in such a way as to be able to transform the size of an image, while the third internal path is devoid of horizontal and vertical filtering.

Moreover, video data relating to a video plane of the image and comprising luminance data and chrominance data that are less numerous than the luminance data are processed exclusively by the first and second internal processing paths. Moreover, one of the first and second internal paths is preferably dedicated exclusively to the processing of luminance data. The filtering of each of the first and second internal paths are independently controllable.

To further optimize the bandwidth, provision is advantageously made to use an auxiliary random access memory, internal to the component, which will be used as a working area to temporarily store results without using the image buffer memory area of the external memory.

Thus, by virtue of this internal memory, the consumption of bandwidth on the external main random access memory is greatly reduced. Stated otherwise, according to an embodiment of the invention, the component comprises an internal random access memory to co-operate with the acceleration unit in such a way as to temporarily store intermediate data during the composition of an image.

Also, to benefit more fully from this internal random access memory, it is particularly advantageous to chop the planes of the image into "small squares" which will be processed one after the other. The size of these squares are linked to the size of the internal random access memory.

More precisely, according to an embodiment of the invention, the processing unit is able, in the presence of an area of an image to be composed comprising more than two planes, to subdivide this area into subareas whose size at the output of the two-dimensional acceleration unit is at most equal to the memory size of the internal memory. Stated otherwise, this size is such that once these two subareas have been composed, the resulting size is at most equal to the memory size of the internal memory.

The acceleration unit is then able to perform the composition of the area by successfully composing the various subareas. The composition of a subarea is performed as several successive elementary compositions. Each elementary composition may implement two intermediate planes. An intermediate plane may be a plane of the subarea or a plane resulting from at least one previous elementary composition of the subarea. Moreover, the result of the last elementary composition of the subarea is stored in the main memory, while the result of each previous elementary composition is stored temporarily in the internal memory.

According to the invention, as indicated above, the acceleration unit is used for the composition of the image. In certain applications, the graphics objects may be generated directly by the processing unit or else originate from an external source. That said, according to a particularly advantageous embodiment of the invention, the acceleration unit may be able to generate graphics objects to be inserted into the graphics planes.

According this embodiment of the invention, the acceleration unit is then used for two functions, namely the generation of graphics objects which is its usual function, and image composition. In this regard, the component comprises a video synchronization generator to deliver vertical synchronization signals at regular intervals, and in the course of certain of these intervals, the acceleration unit may compose an image to be displayed in regards to composition instructions.

The acceleration unit is then advantageously able to generate the graphics objects in accordance with a list of application instructions and, within an interval, the image composition task has priority over the graphics objects generation task.

For this purpose, according to an embodiment of the invention, the graphics acceleration unit may comprise control means or a control circuit to trigger the image composition task on the occurrence of a vertical synchronization signal, then to trigger a graphics object generation task or to authorize the resumption of a graphics object generation task interrupted during the occurrence of the vertical synchronization signal.

The device according to the invention may be advantageously embodied in the form of an integrated circuit. Another aspect of the invention is to provide a video decoder incorporating a video and graphics data processing device as defined above.

Yet another aspect of the invention is to provide a method of processing video and graphics data, in which images comprising at least one video plane and eventually at least one graphics plane are composed in real time within a two-dimensional acceleration unit and are stored in a main memory. Then the image data thus composed may be extracted from the main memory for displaying the corresponding images. The main memory is, for example, situated external a component comprising the acceleration unit.

According to a mode of implementation of the invention, vertical synchronization signals are delivered at regular intervals. During a first interval, a scene analysis of the image to be displayed may be performed and a list of composition instructions of the image may be generated. During a second interval, following the first, the image to displayed may be composed in regards to the composition instructions and it is stored in the main memory. During a third interval, following the second, the image data of the image to be displayed may be extracted.

The scene analysis may comprise, for example, a segmentation of this scene into several areas or regions that are homogeneous in terms of composition (number of planes, order of the planes, redimensioning parameters, etc.). A composition list of the area is then generated for each area.

According to a mode of implementation of the invention, coded video data are received, and the video data are decoded and stored in the main memory during the first interval. Composition instructions may be generated for only certain areas of the image.

When certain areas of the image to be composed comprise more than two planes, these areas of the image may be composed as several successive elementary compositions. Each elementary composition may implement two intermediate planes. An intermediate plane may be a plane of the image or a plane resulting from at least one previous elementary composition.

According to a mode of implementation of the invention, intermediate data are stored temporarily during the composition of an image, in a memory internal to the component comprising the acceleration unit. Graphics objects intended to be inserted into the graphics planes may also be generated within the acceleration unit.

More precisely, and according to a mode of implementation of the invention, vertical synchronization signals may be delivered at regular intervals, and in the course of certain of these intervals, an image to be displayed is composed in regards to composition instructions. The graphics objects are generated in accordance with a list of application instructions and within an interval the image composition task has priority over the graphics objects generation task.

The image composition task is triggered, for example, on the occurrence of a vertical synchronization signal. Then on completion of this composition task a graphics objects generation task is triggered, or the resumption of a graphics objects generation task interrupted during the occurrence of the vertical synchronization signal is authorized.

BRIEF DESCRIPTION OF THE DRAWINGS

Other advantages and characteristics of the invention will become apparent on examining the detailed description of embodiments and modes of implementation, which are in no way limiting, and of the appended drawings, in which:

FIG. 12 diagrammatically illustrates a manner of operation of an acceleration unit such as represented in FIG. 10.

DETAILED DESCRIPTION OF THE PREFERRED EMBODIMENTS

Figure 1:
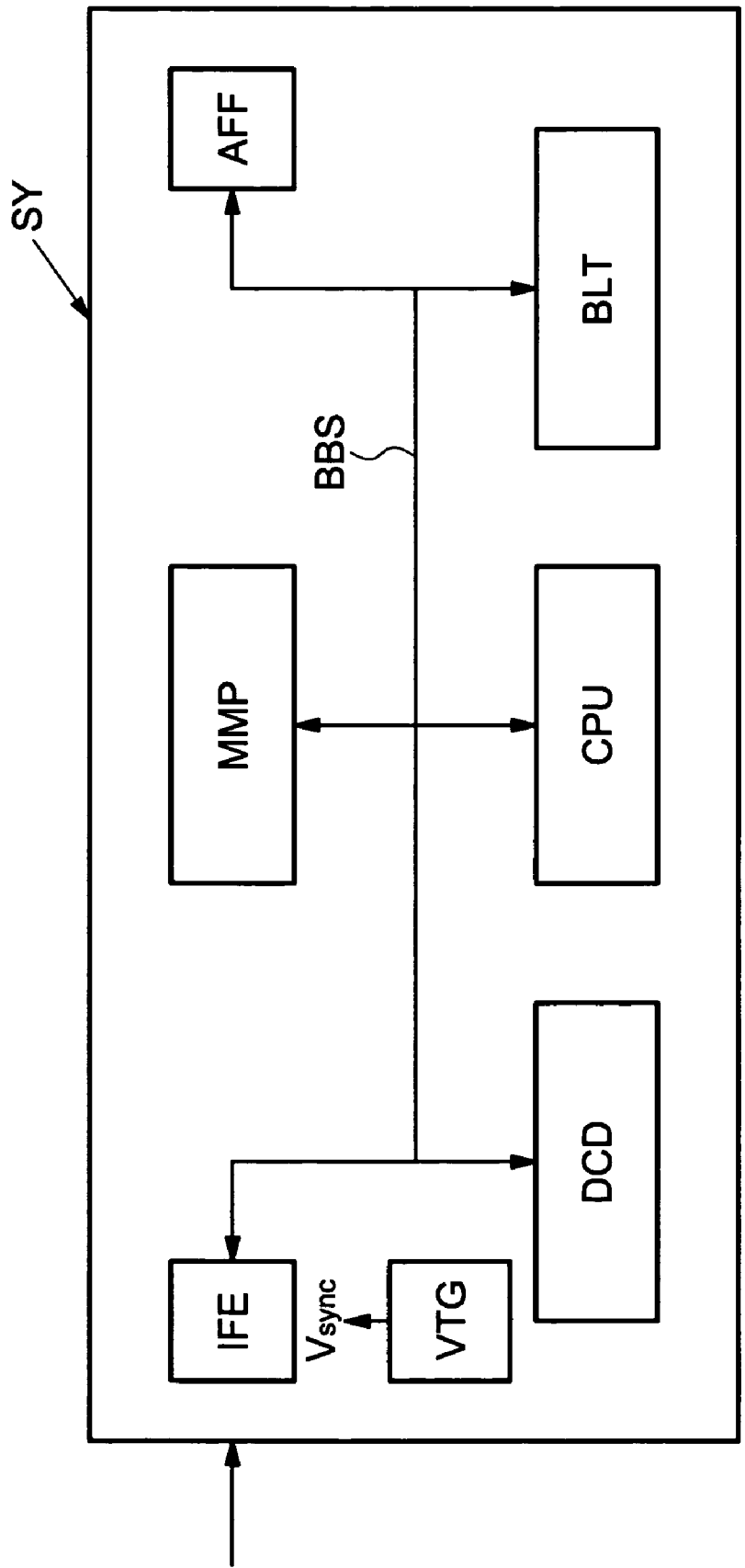
FIG. 1 diagrammatically illustrates a first embodiment of a processing device according to the invention.

In FIG. 1, the reference SY designates in a general manner a digital image processing device incorporating, for example, a satellite decoder and eventually a television set. In this device SY, an input IFE receives, for example, from a satellite antenna or from a digital disk (not represented here for the sake of simplification) a stream of data compressed according, for example, to the MPEG standards.

An image decoding device DCD, for example an MPEG decoder, decodes the images coded on the basis of these compressed data, for their display on a display screen AFF.

The device SY moreover comprises a processing unit CPU, or microprocessor, that can for example manage the decoding of various satellite channels as well as a generator BLT for graphics information intended to be inlaid on the screen superimposed on the video images, for example, interactive menus obtained by actuating a television remote control. This generator BLT is a two-dimensional acceleration unit which, as will be seen in greater detail below, will allow the composition of the images to be displayed.

The device SY also comprises a dynamic memory MMP, for example a memory of the DDR/SDRAM type, which is shared between these various elements. All of the elements of FIG. 1 converse via a bidirectional bus BBS.

Finally, the device SY comprises a video synchronization generator VTG able to deliver vertical synchronization signals Vsync at regular intervals. According to the mode of display used on the screen, these vertical synchronization signals may separate frames of an image or else images.

Figure 2:
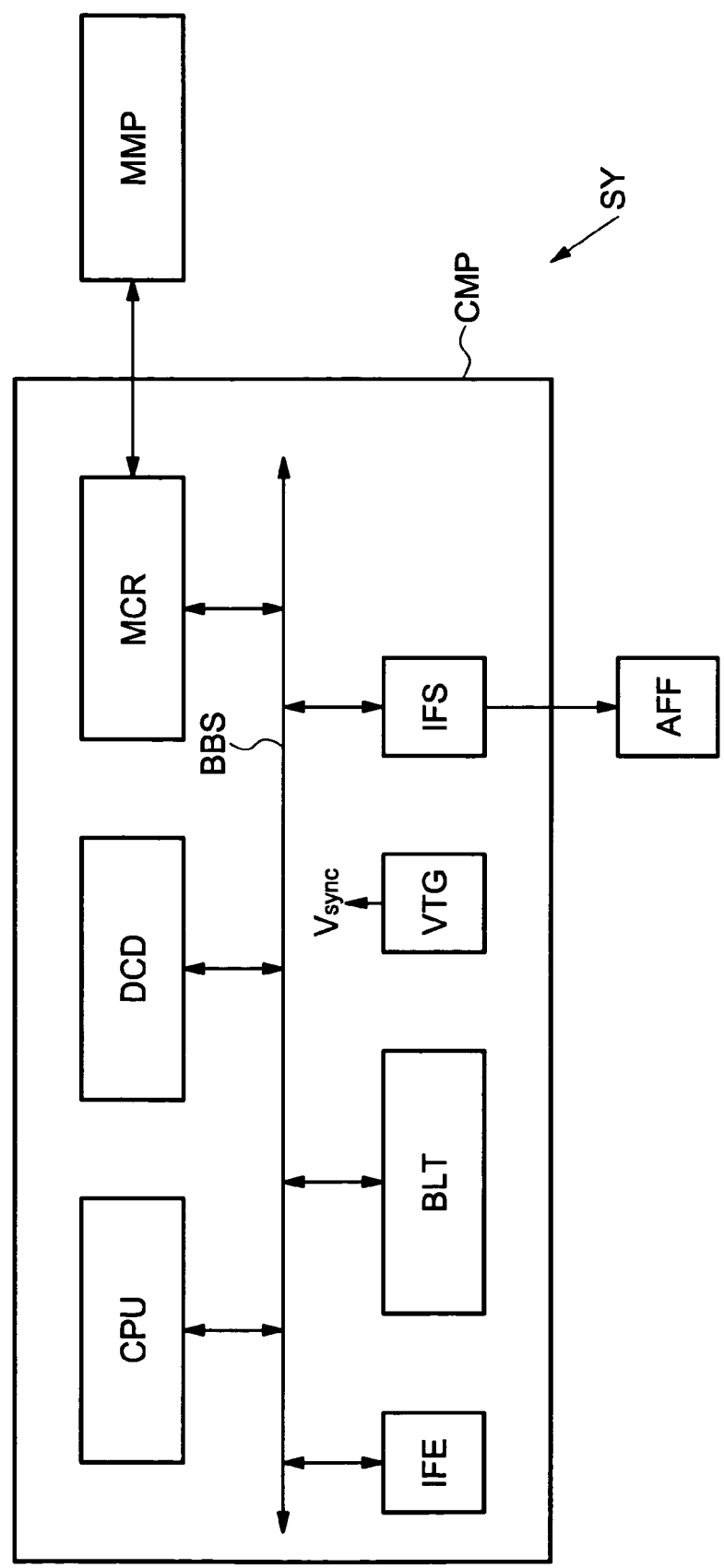
FIG. 2 diagrammatically illustrates another embodiment of a device according to the invention.

While the memory MMP could be part of the integrated circuit forming the component incorporating the decoder DCD, the processor CPU, the acceleration unit BLT and the interface IFE, it is also possible, as illustrated in FIG. 2, for the main memory MMP to be a memory external to the component CMP. In this case, the memory MMP converses with the other elements of the component CMP by way of a memory controller MCR. Moreover, an output interface IFS, of the DMA type, is linked to the bus BBS and to the display AFF.

Figure 3:
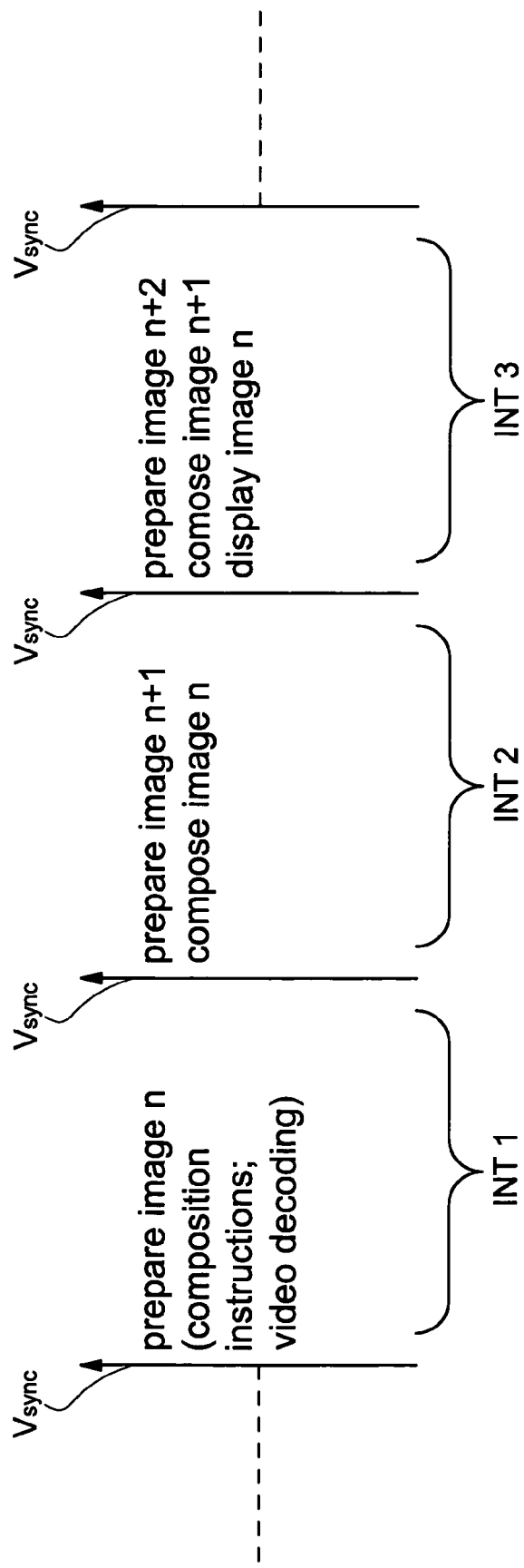
FIG. 3 diagrammatically illustrates image processings according to a mode of implementation of the invention.

As illustrated in FIG. 3, the video synchronization generator delivers vertical synchronization signals Vsync at regular intervals. Moreover, generally, an image comprises several planes (or layers) including at least one video plane and one graphics plane.

Also, as illustrated in FIG. 3, during a first interval INT1, the processing unit CPU is able to perform a scene analysis of the image to be displayed and to generate a list of composition instructions for this image. Moreover, during this first interval INT1, the video decoding unit DCD performs the decoding of the video data and stores them in the main memory MMP.

Then, during a second interval INT2, following the first interval INT1, the acceleration unit BLT composes the image to be displayed, in regard to the composition instructions and stores it in the main memory. In parallel with this, during this interval INT2, the processing unit CPU prepares the next image n+1. Then, during a third interval INT3, following the second INT2, the output interface IFS extracts the image data of image n from the main memory MMP, for its display.

Figure 4:
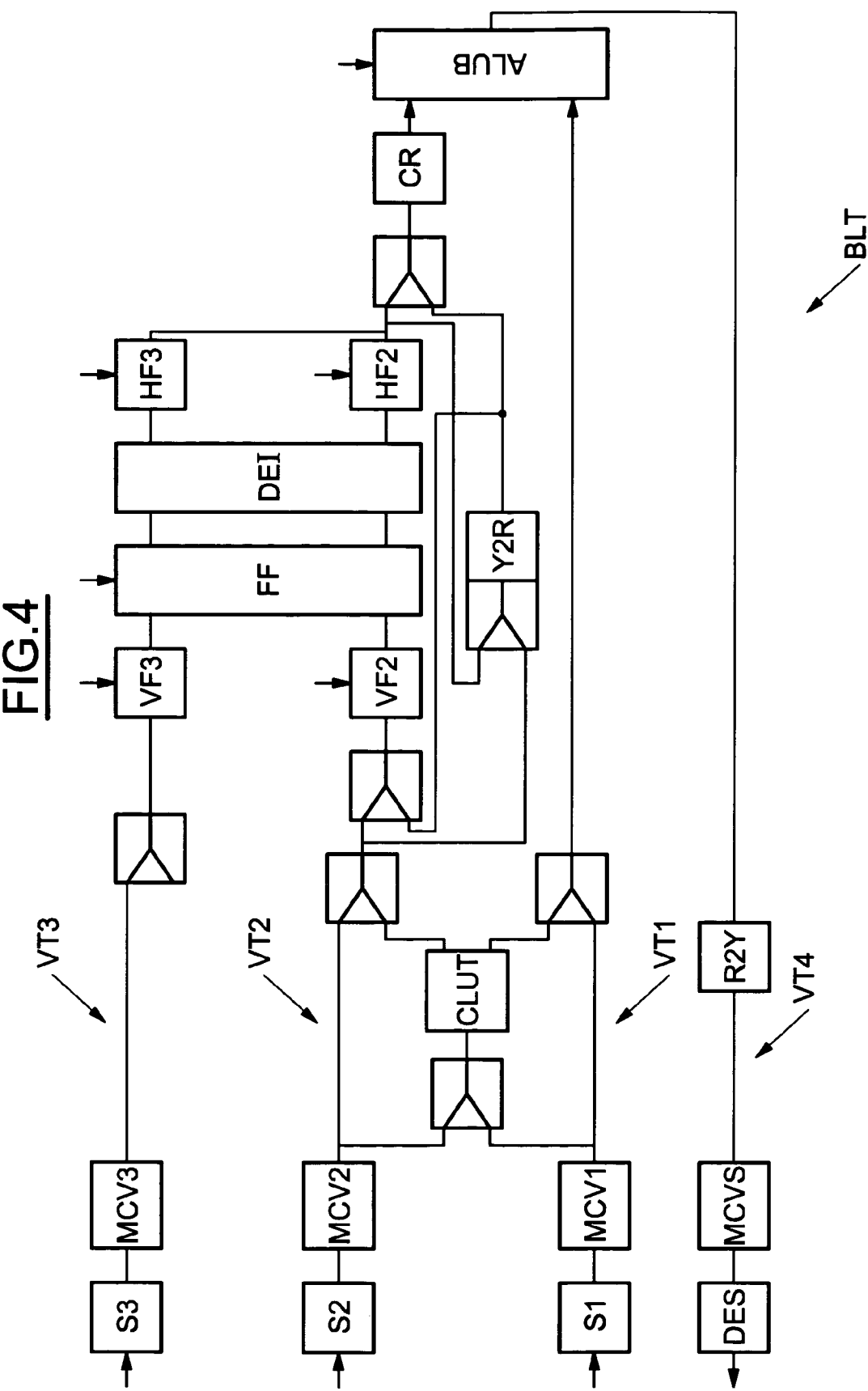
FIG. 4 diagrammatically illustrates an embodiment of a two-dimensional acceleration unit according to the invention.

In parallel with this, during the interval INT3, the processing unit CPU prepares the next image n+2, while the acceleration unit BLT composes image n+1. This image composition will be discussed in greater detail below. In this regard, an internal architecture of an image acceleration unit BLT allowing image composition will now be described in greater detail while referring more particularly to FIG. 4.

As compared with a conventional accelerator structure, which allows only the generation of graphics objects, the acceleration unit BLT according to the invention comprises, in particular, an additional processing path, in this instance the path VT3. Stated otherwise, the unit BLT comprises three inputs S1, S2, S3 (three FIFO memories), connected to the three processing paths VT1, V22 and VT3, which end up at an arithmetic and logic composition unit ALUB, conventionally formed of multipliers.

Moreover, the unit BLT comprises a conventional output processing path VT4 connected between the output of the composition unit ALUB and an output FIFO memory DES. At the head end of each of the processing paths VT1-VT3 are disposed input conversion means or converters MCV1-MCV3. Each of these converters is intended to receive, for example, words of 128 bits and to deliver pixels of 32 bits according, for example, to an αRGB format of 4×8 bits. αdesignates the 8 transparency bits of the pixel.

Such converters are conventional, and comprise in particular means or a circuit for managing reading to the FIFO memory as well as a sequencer and a color encoder. On the output path VT4, converter MCVS, likewise of conventional structure, performs processings inverse to those performed in the converters MCV1-MCV3.

When the converters MCV1 or MCV2 deliver words corresponding to an indexed color, provision is then made to use a color lookup table CLUT in such a way as to obtain the true color format. Likewise, color converters, referenced Y2R, and capable of transforming from the YCbCr format into the αxRGB format, are provided in parallel with one of the processing paths, in this instance the path VT2. Likewise, inverse converters R2Y are provided on the output path VT4.

Moreover, the paths VT2 and VT3 are equipped with horizontal and vertical filters, referenced HF2, HF3 and VF2, VF3 respectively, in such a way as to be able to transform the size of an image, while the processing path VT1 is devoid of horizontal and vertical filters.

Between these vertical and horizontal filters, are disposed an anti-flicker filter FF, as well as a deinterlacing circuit DEI. The filtering of each of the paths VT2 and VT3 are independently controllable. This allows separate handling of the rescale factor (or resize factor) for the luminance data Y and chrominance data CbCr, for example.

The horizontal and vertical filters as well as the anti-flicker filter and the deinterlacer, are conventional. This said, it is possible for example to use filtering and an anti-flicker filter such as those described for example in French Patent Applications Nos. 2,801,463 and 2,798,033. Video data relating to a video plane of the image to be composed, and comprising luminance data Y and chrominance data CbCr that are less numerous than the luminance data, are processed exclusively by the processing paths VT2 and VT3.

Figure 5:
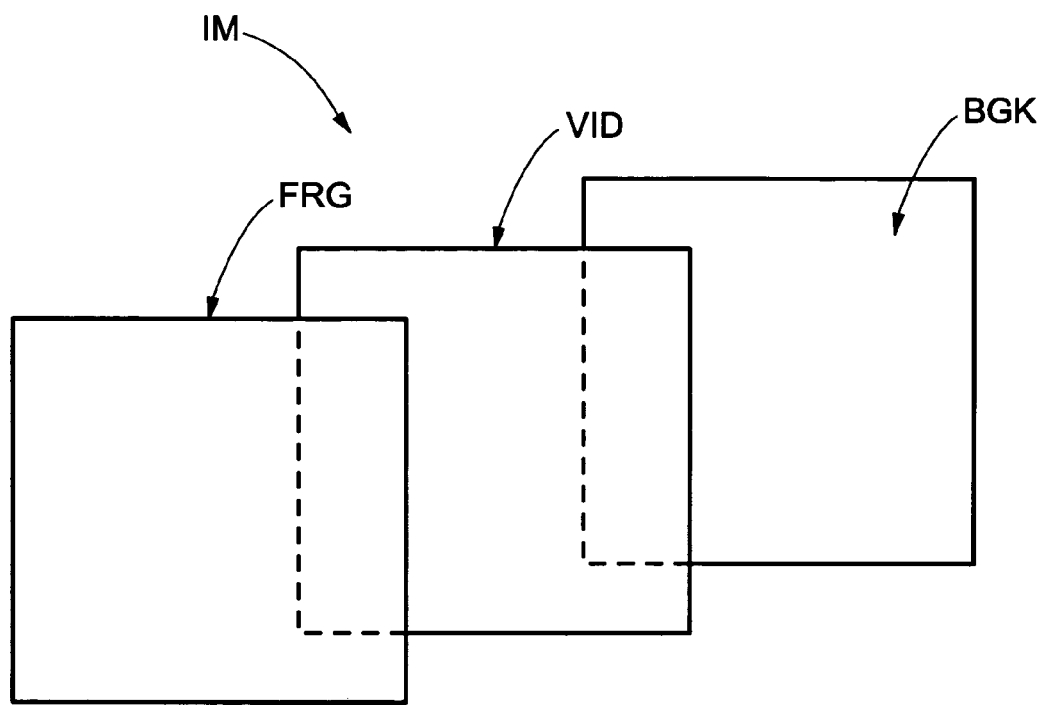
FIGS. 5 and 6 diagrammatically illustrate an example of an image composition according to the invention.
Figure 6:
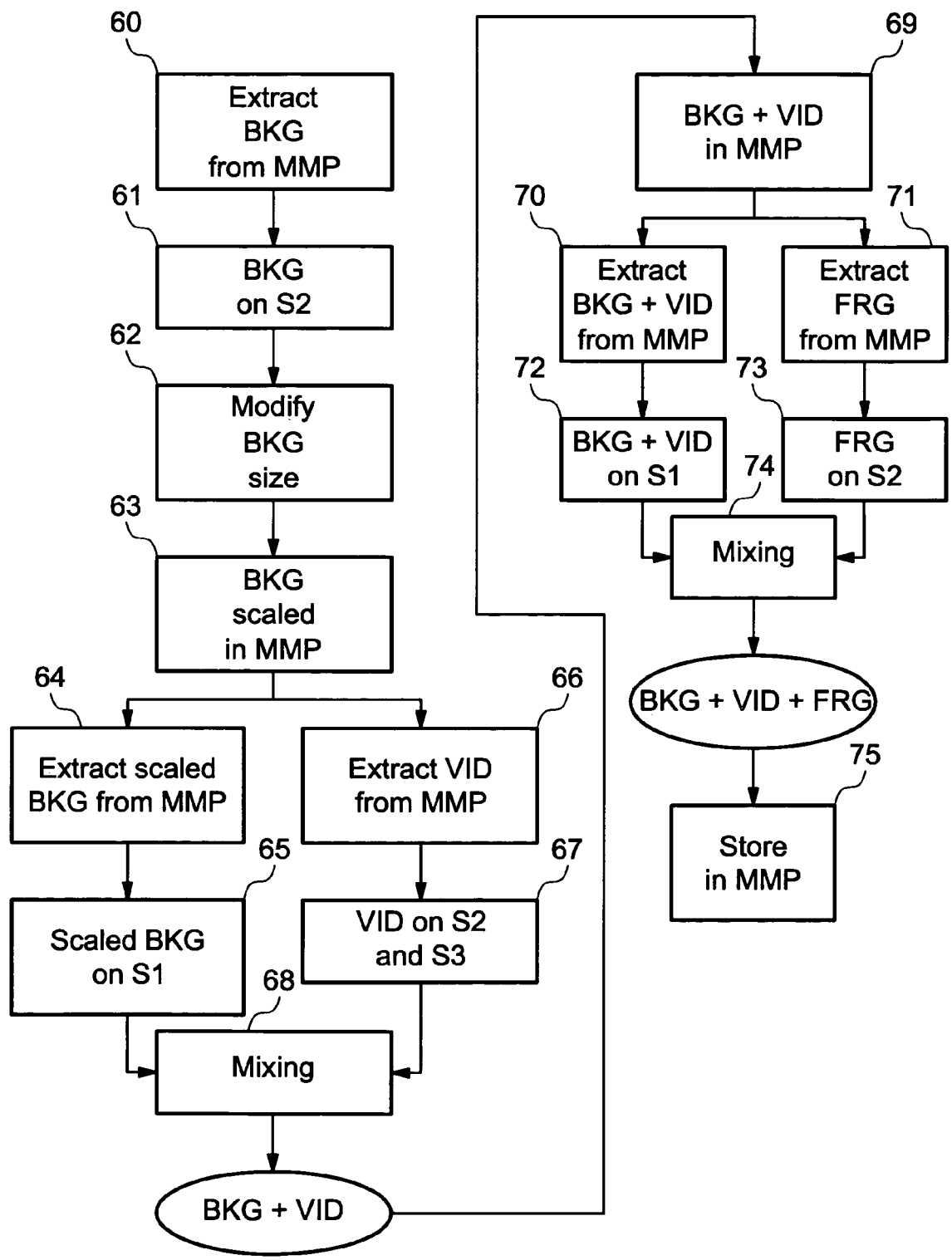

Also, by way of example, the processing path VT3 will be dedicated exclusively to the processing of luminance data. An example of image composition will now be described while referring more particularly to FIGS. 5 and 6. In this example, it is assumed that the image IM is composed of three planes, namely, a background graphics plane BKG, a foreground graphics plane FRG and a video plane VID.

With the composition instructions and the decoding of video data having been performed, the background plane BKG is extracted from the main memory MMP (step 60) and is delivered on the input S2 (step 61), so as to be able to be scaled after passing through the vertical and horizontal filters (step 62). Specifically, since the graphics planes have specific formats, a scaling is generally necessary.

Then, the graphics data representative of the scaled plane BKG are stored in the main memory MMP, and more exactly, in a specific memory area "frame buffer" of the memory MMP (step 63). Then, the image data corresponding to the scaled plane BKG are extracted from this specific memory area (step 64), and the video data corresponding to the video plane VID are likewise extracted from the memory MMP (step 66). Then the luminance data of the video plane are delivered to the input S3, while the chrominance data of the video plane are delivered on the input S2 (step 67).

After resealing to take account of the lesser number of chrominance data relative to the luminance data, the video data are mixed (step 68) in the composition unit ALUB with the graphics data arising from the processing path VT1 and corresponding to the scaled graphics plane BKG. On completion of this mixing step 68, an elementary composition of two planes of the image has been carried out, and the corresponding data BKG+VID are delivered to the output DES so as to be stored in the specific memory area of the main memory MMP (step 69).

Then, these data BKG+VID are extracted from the specific memory area of the memory MMP (step 70) so as to be delivered on the input S1 of the acceleration unit BLT (step 72) to be injected into the composition unit ALUB without undergoing filter processing. In parallel with this, the data representative of the foreground graphics plane FRG are extracted from the memory MMP (step 71) so as to be delivered on the input S2 (step 73) to undergo a scaling processing (step 73) before the mixing (step 74) in the composition unit ALUB with the data BKG+VID.

Another elementary composition implementing the plane FRG and plane BKG+VID resulting from the previous elementary composition is thus carried out. The corresponding data are delivered at the output DES of the acceleration unit BLT to be stored in the specific memory area of the memory MMP (step 75).

Figure 7:
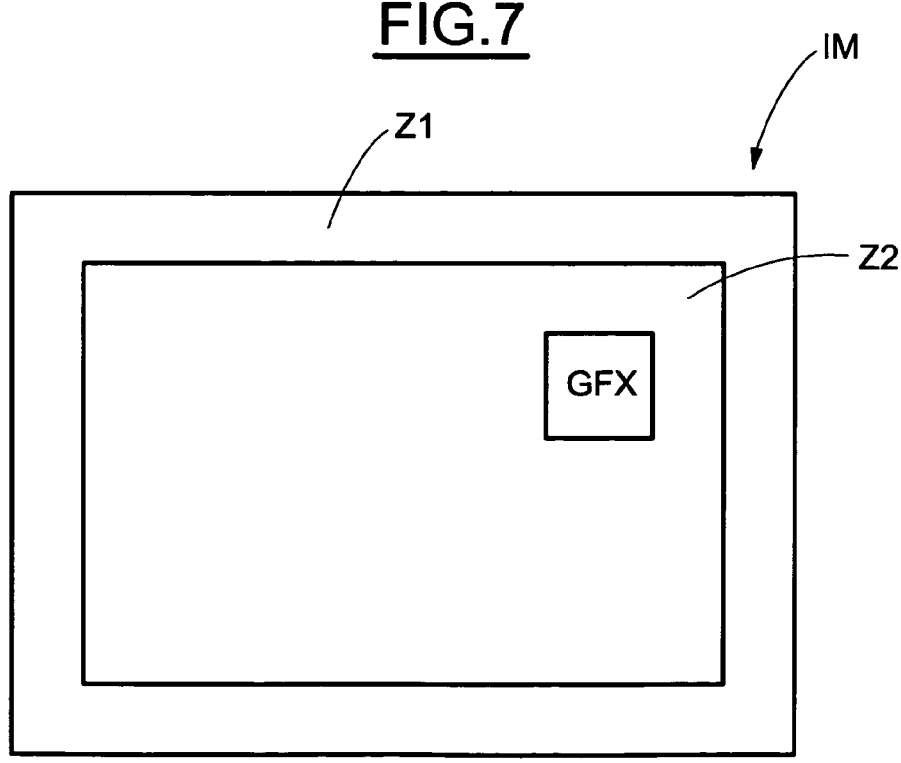
FIG. 7 diagrammatically illustrates another example of an image composition according to the invention.

When the image to be composed comprises planes of which certain parts are not modified with respect to the previous images, the processing unit can then generate composition instructions for certain image parts only. Thus, if it is assumed for example that the image IM of FIG. 7 comprises a fixed background graphics plane, that is, one that is not modified from one image to another, and that the video plane occupies only an area Z2 of the image IM. The processing unit CPU will then deliver composition instructions only for the area Z2 of the image and not for the fixed area Z1, in such a way as to compose the video plane with the corresponding area of the background graphics plane and with an object GFX situated in the plane FRG, for example.

The invention therefore has the advantage of not requiring any updating of the non-modified parts of the specific image memory area until a change, if any, in the scene. Moreover, the invention allows effective processing of the opacities of the image by thus avoiding the accessing of hidden pixels. This thus makes it possible to limit the consumption of bandwidth at the main memory level.

It is also possible, with the invention, to compose images possessing viewports situated on the same line of the image. The embodiment illustrated in FIG. 8 allows an even further reduction in bandwidth consumption at the level of the main memory MMP.

Figure 8:
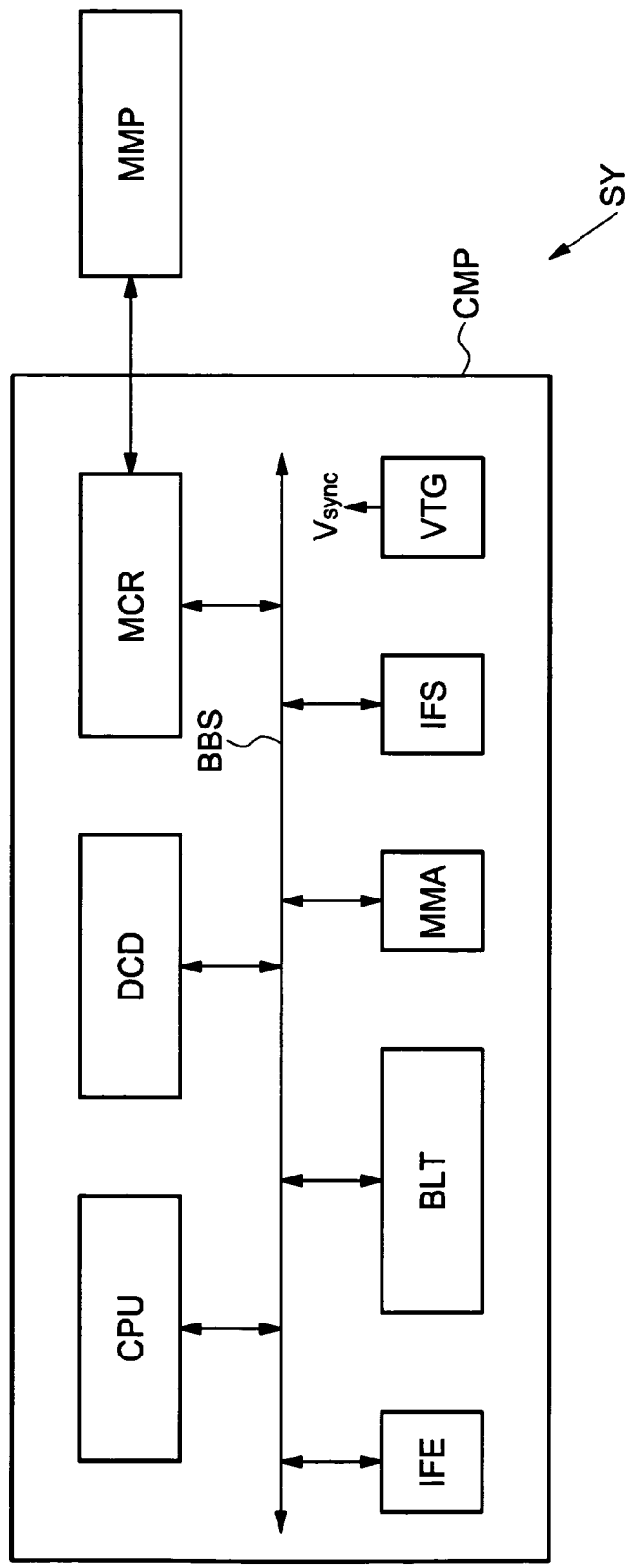
FIG. 8 diagrammatically illustrates another embodiment of a device according to the invention.

Relative to the embodiment just described, that illustrated in FIG. 8 makes provision for the component CMP to comprise, furthermore, an internal random access memory MMA, or auxiliary memory. This memory is, for example, a static memory of the SRAM type.

This internal random access memory MMA is able to co-operate with the acceleration unit BLT, in such a way as to temporarily store intermediate data during the composition of an image. More particularly, instead of composing the complete plane of an image in one go, the planes will be divided into subareas or squares, whose size will depend on the memory size of the memory MMA as well as the pixel format used.

Figure 9:
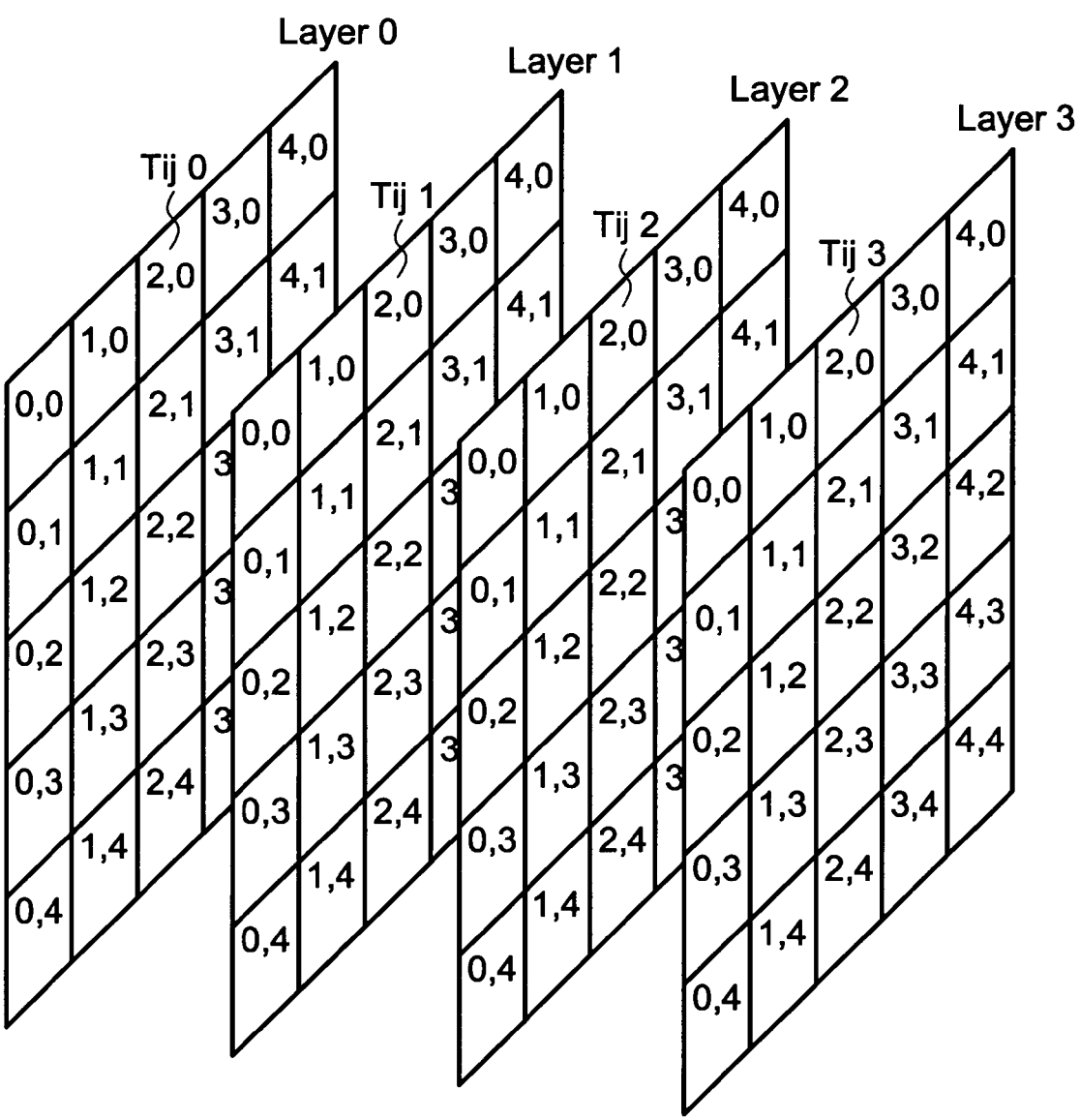
FIGS. 9 and 10 diagrammatically illustrate another example of an image composition according to the invention.

Also, all these squares, of small size, will be processed one after the other. Thus, referring to FIG. 9, in which the image IM is assumed to be composed of four planes or layers, each layer is decomposed into squares Tij. Thus, as illustrated likewise in FIG. 10, the first elementary composition will relate to each square Tij0 of layer 0 and the square Tij1 of layer 1.

Thus, for each square ij, the square Tij0 will be extracted from the main memory MMP and delivered to the input S1 of the acceleration unit BLT, while the square Tij1 will be extracted from the memory MMP and delivered on the input S2 of the acceleration unit BLT. The output DES of this acceleration unit BLT will then deliver a first intermediate square TI1ij which will be stored in the auxiliary memory MMA.

Then, the intermediate square TI1ij will be extracted from the memory MMA and delivered to the input S1 of the acceleration unit BLT, so as to be composed, during a second elementary composition, with the square Tij2, extracted from the memory MMP and present at the input S2 of the acceleration unit BLT, so as to form a second intermediate square TI2ij. This second intermediate square TI2ij is in its turn stored in the memory MMA.

Then, the operation is repeated during the third and last elementary composition (since here there are only four layers). More precisely, the second intermediate square TI2ij is extracted from the memory MMA, delivered to the input S1 of the acceleration unit BLT to be mixed with the square Tij3 extracted from the memory MMP and delivered to the input S2 of the unit BLT.

The result of this third elementary composition is a fully composed square TCij, which this time will be stored in the specific memory area of the main memory MMP. The auxiliary memory MMA thus enables the acceleration unit to avoid consuming bandwidth on the main memory MMP, in order to store intermediate results.

The execution time is thus reduced, thereby facilitating the real-time control of processing. While the graphics objects may sometimes be generated in the processing unit CPU itself, or else originate directly from an external source, it has been particularly advantageous to use the acceleration unit BLT to generate at the same time these graphics objects and to compose the images.

Figure 11:
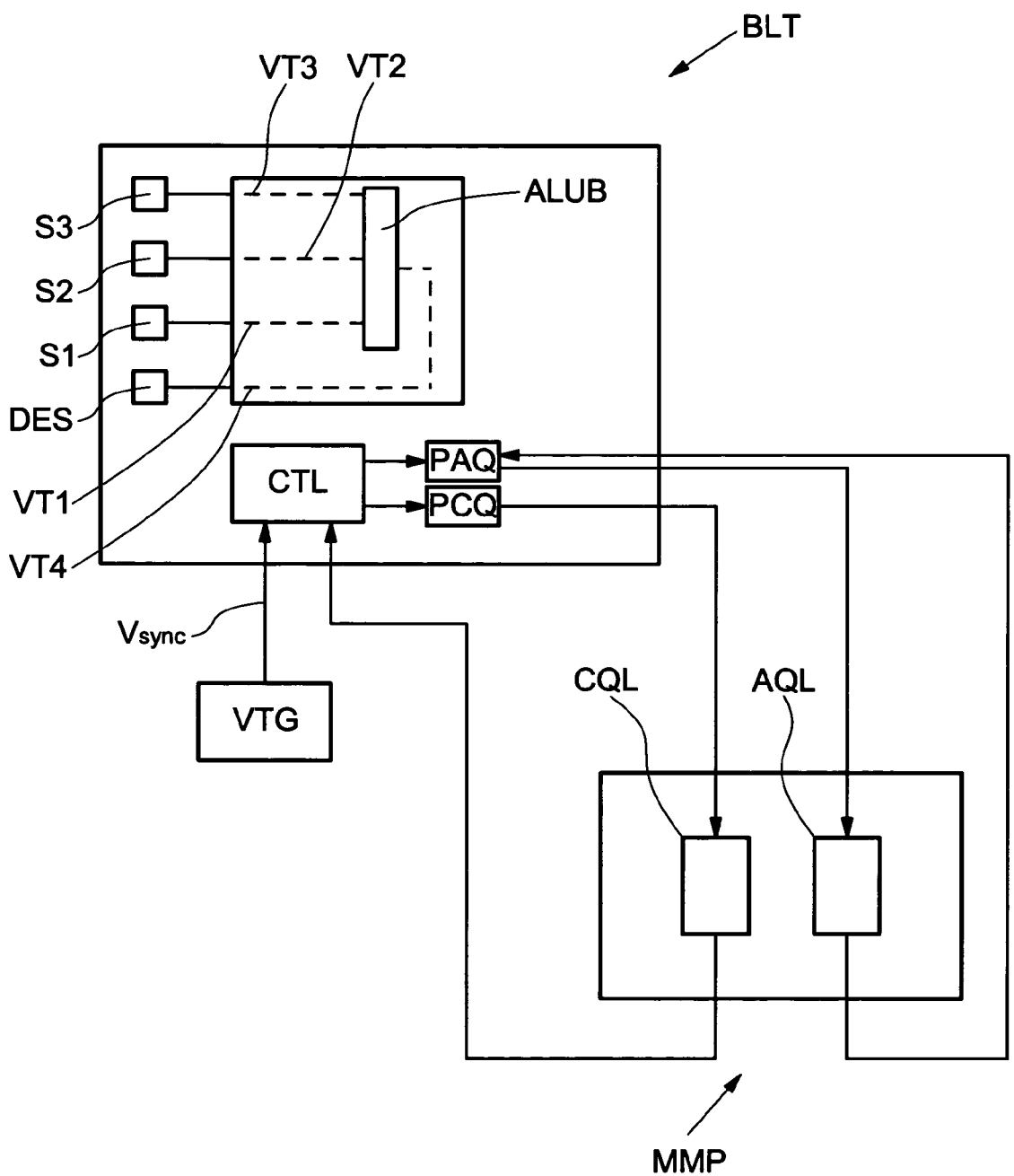
FIG. 11 diagrammatically illustrates another embodiment of an acceleration unit according to the invention.

This is the aim of the embodiment illustrated more particularly in FIGS. 11 and 12. As indicated previously, the composition unit BLT composes images, having regards to composition instructions contained in the memory MMP and forming a list of composition instructions CQL (FIG. 11).

Moreover, the generation of graphics objects by the acceleration unit is performed likewise, in accordance with a list of application instructions AQL likewise stored in the main memory MMP. Also, to be able to ensure at the same time the composition of an image and the generation of graphics objects, the invention provides that within an interval separated by two occurrences of the signal Vsync, the image composition task has priority over the graphics objects generation task.

In this regard, provision is made for the graphics acceleration unit to comprise controller CTL, able to trigger the image composition task on the occurrence of a vertical synchronization signal Vsync, then to trigger a graphics objects generation task on completion of the image composition task or to authorize the resumption of a graphics object generation task which has been interrupted during the occurrence of the vertical synchronization signal.

This will be better understood on examining FIG. 12. On the occurrence of a signal Vsync delivered by the generator VTG and received by the controller CTL, the latter then activates a pointer PCQ which points to the first address of the list of composition instructions CQL.

The composition instructions $cN_1$-$cN_{10}$ are thereafter executed in succession, then, when the controller detect that the last instruction $cN_{10}$ has been executed, they activate an address pointer PAQ which designates the application instruction to be executed.

In the example illustrated in FIG. 12, the list AQL had begun at the previous interval with the instruction $aN_1$. Then, the instruction $aN_2$ had been executed. On completion of the execution of this instruction $aN_2$, the occurrence of the signal Vsync which triggered the image composition task $cN_1$-$cN_{10}$ took place. In parallel with this triggering, the next address in the current application instructions list, in this instance the address $aN_3$, had been updated in the pointer PAQ.

Additionally, after the execution of the composition instruction $cN_{10}$, the generation of the graphics object continues from the instruction $aN_3$ up to the instruction $aN_6$. Then, in the example illustrated here, there is an idle time before the occurrence of the next signal Vsync.

That which is claimed is:

1. A device for processing video and graphics data comprising:
    a memory for storing video and graphics data; and
    a component coupled to said memory and comprising
        a processing unit,
        a two-dimensional acceleration unit cooperating with said processing unit and said memory to compose in real time image data comprising one or more video planes and without a graphics plane, and alternatively to compose in real time other image data comprising one or more video planes and one or more graphics planes, and to store the composed image data in said memory,
        an output interface for extracting the composed image data from said memory for display on an image display, and
        an internal random access memory for cooperating with said two-dimensional acceleration unit to temporarily store intermediate data during composition of an image.

2. A device according to claim 1, wherein said memory comprises a random access memory.

3. A device according to claim 1, wherein said component further comprises a video synchronization generator for delivering vertical synchronization signals at regular intervals, with the regular intervals comprising:
    a first interval, during which said processing unit performs a scene analysis of the image to be displayed and generates a list of composition instructions for the image;
    a second interval, following the first interval, during which said two-dimensional acceleration unit composes the image to be displayed based upon the composition instructions and stores it in the said memory; and
    a third interval, following the second interval, during which the output interface extracts the image data of the image to be displayed.

4. A device according to claim 3, wherein said component further comprises:
    an interface for receiving coded video data; and
    a video decoding unit co-operating with said processing unit and said memory, said video decoding unit performs the decoding of the video data and stores them in said memory during the first interval.

5. A device according to claim 3, wherein said processing unit generates composition instructions for certain areas of the image to be composed.

6. A device according to claim 5, wherein the certain areas of the image to be composed comprise more than two planes; and wherein said two-dimensional acceleration unit composes these areas into several successive elementary compositions, each elementary composition implementing two intermediate planes, with an intermediate plane being a plane of the image or a plane resulting from at least one previous elementary composition.

7. A device according to claim 6, wherein said two-dimensional acceleration unit comprises:
   first, second and third inputs;
   first, second and third internal processing paths respectively connected to said first, second and third inputs;
   a controllable composition unit connected to an output of each of said first, second and third internal processing paths; and
   a fourth internal processing path connected to an output of said controllable composition unit.

8. A device according to claim 7, wherein said first and second internal processing paths each comprise horizontal and vertical filters for transforming a size of an image, and said third internal path is devoid of horizontal and vertical filters; and wherein the video data relating to a video plane of the image comprising luminance data and chrominance data that are less numerous than the luminance data are processed exclusively by said first and second internal processing paths.

9. A device according to claim 8, wherein said first and second internal processing paths are dedicated exclusively to the processing of luminance data.

10. A device according to claim 8, wherein said horizontal and vertical filters in each of said first and second internal processing paths are controlled independently.

11. A device according to claim 1, wherein said processing unit, in the presence of an area of an image to be composed comprising more than two planes, subdivides this area into subareas whose size at an output of said two-dimensional acceleration unit is at most equal to a memory size of the said internal random access memory, and in that said two-dimensional acceleration unit performs the composition of the area by successfully composing the various subareas, with the composition of a subarea being performed as several successive elementary compositions, each elementary composition implementing two intermediate planes, with an intermediate plane being a plane of the subarea or a plane resulting from at least one previous elementary composition of the subarea, and in that a result of a last elementary composition of the subarea is stored in said memory, while a result of each previous elementary composition is stored temporarily in said internal random access memory.

12. A video decoder comprising:
   a memory for storing video and graphics data; and
   a component coupled to said memory, said component comprising
   a processing unit,
   an acceleration unit cooperating with said processing unit and said memory to compose in real time image data comprising one or more video planes and without a graphics plane, and alternatively to compose in real time other image data comprising one or more video planes and one or more graphics planes, and to store the composed image data in said memory,
   an output interface for extracting the composed image data from said memory for displaying on a display,
   an internal random access memory for cooperating with said acceleration unit to temporarily store intermediate data during composition of an image,
   said processing unit, in the presence of an area of an image to be composed comprising more than two planes, subdivides this area into subareas whose size at an output of said acceleration unit is at most equal to a memory size of the said internal random access memory, and
   said acceleration unit performs the composition of the area by successfully composing the various subareas, with the composition of a subarea being performed as several successive elementary compositions, each elementary composition implementing two intermediate planes, with an intermediate plane being a plane of the subarea or a plane resulting from at least one previous elementary composition of the subarea, and in that a result of a last elementary composition of the subarea is stored in said memory, while a result of each previous elementary composition is stored temporarily in said internal random access memory.

13. A video decoder according to claim 12, wherein said component further comprises a video synchronization generator for delivering vertical synchronization signals at regular intervals, with the regular intervals comprising:
   a first interval, during which said processing unit performs a scene analysis of the image to be displayed and generates a list of composition instructions for the image;
   a second interval, following the first interval, during which said acceleration unit composes the image to be displayed based upon the composition instructions and stores it in the said memory; and
   a third interval, following the second interval, during which the output interface extracts the image data of the image to be displayed.

14. A video decoder according to claim 13, wherein said component further comprises:
   an interface for receiving coded video data; and
   a video decoding unit cooperating with said processing unit and said memory, said video decoding unit performs the decoding of the video data and stores them in said memory during the first interval.

15. A video decoder according to claim 13, wherein said processing unit generates composition instructions for certain areas of the image to be composed; and wherein the certain areas of the image to be composed comprise more than two planes; and wherein said acceleration unit composes these areas into several successive elementary compositions, each elementary composition implementing two intermediate planes, with an intermediate plane being a plane of the image or a plane resulting from at least one previous elementary composition.

16. A video decoder according to claim 15, wherein said acceleration unit comprises:
   first, second and third inputs;
   first, second and third internal processing paths respectively connected to said first, second and third inputs;
   a controllable composition unit connected to an output of each of said first, second and third internal processing paths; and
   a fourth internal processing path connected to an output of said controllable composition unit.

17. A video decoder according to claim 16, wherein said first and second internal processing paths each comprise horizontal and vertical filters for transforming a size of an image, and said third internal path is devoid of horizontal and vertical filters; and wherein the video data relating to a video plane of the image comprising luminance data and chrominance data that are less numerous than the luminance data are processed exclusively by said first and second internal processing paths.

18. A method for processing video and graphics data comprising:
   composing image data comprising one or more video planes and without a graphics plane, and alternatively to compose other image data comprising one or more video planes and one or more graphics planes in real time within a two-dimensional acceleration unit;
   generating graphics objects within the two-dimensional acceleration unit to be inserted into the one or more graphics planes;
   delivering vertical synchronization signals at regular intervals, and during certain of these intervals, an image to be displayed is composed based upon composition instructions, in that the graphics objects are generated based upon a list of application instructions, and in that within an interval an image composition task has priority over a graphics object generation task;
   storing in a memory the composed image data; and
   extracting from the memory the composed image data for displaying corresponding images.

19. A method according to claim 18, wherein the memory is external said two-dimensional acceleration unit.

20. A method according to claim 18, wherein vertical synchronization signals are delivered at regular intervals, the method further comprising:
   during a first interval, performing a scene analysis of the image to be displayed and generating a list of composition instructions of the image;
   during a second interval, following the first interval, composing the image to be displayed based upon the composition instructions and storing in the memory; and
   during a third interval following the second interval, extracting the image data of the image to be displayed are extracted.

21. A method according to claim 20, wherein coded video data are received, with the coded video data then being decoded and stored in the memory during the first interval.

22. A method according to claim 20, wherein the composition instructions are generated for certain areas of the image to be composed.

23. A method according to claim 22, wherein the certain areas of the image to be composed comprise more than two planes and these areas of the image are composed as several successive elementary compositions, each elementary composition implementing two intermediate planes, with an intermediate plane being a plane of the image or a plane resulting from at least one previous elementary composition.

24. A method according to claim 23, wherein the two-dimensional acceleration unit comprises first, second and third inputs; first, second and third internal processing paths respectively connected to the first, second and third inputs; a controllable composition unit connected to an output of each of the first, second and third internal processing paths; and a fourth internal processing path connected to an output of the controllable composition unit; and wherein the first and second internal processing paths each comprise horizontal and vertical filters for transforming a size of an image, and the third internal path is devoid of horizontal and vertical filters; and wherein the video data relating to a video plane of the image comprising luminance data and chrominance data that are less numerous than the luminance data are processed exclusively by the first and second internal processing paths.

25. A method according to claim 24, wherein the first and second internal processing paths are dedicated exclusively to the processing of luminance data.

26. A method according to claim 24, wherein the horizontal and vertical filtering in each of the first and second internal processing paths are controlled independently.

27. method according to claim 26, wherein intermediate data is stored temporarily during the composition of an image in a memory internal to a component comprising the two-dimensional acceleration unit.

28. A method according to claim 27, wherein in the presence of an area of an image to be composed comprising more than two planes, this area is subdivided into subareas, in that the composition of the area is performed by successively composing the various subareas, the composition of a subarea being performed as several successive elementary compositions, each elementary composition implementing two intermediate planes, an intermediate plane being a plane of the subarea or a plane resulting from at least one previous elementary composition of the subarea, and in that a result of a last elementary composition of the subarea is stored in the memory, while a result of each previous elementary composition is stored temporarily in the internal memory, and in that a size of a subarea is such that once two subareas have been composed, a resulting size is at most equal to a memory size of the internal memory.

29. A method according to claim 18, wherein the image composition task is triggered on the occurrence of a vertical synchronization signal, then on completion of this composition task a graphics object generation task is triggered or the resumption of a graphics object generation task interrupted during the occurrence of the vertical synchronization signal is authorized.

30. A device for processing video and graphics data comprising:
   a memory for storing video and graphics data; and
   a component coupled to said memory and comprising
      a processing unit,
      a two-dimensional acceleration unit cooperating with said processing unit and said memory to compose in real time image data comprising one or more video planes and without a graphics plane, and alternatively to compose in real time other image data comprising one or more video planes and one or more graphics planes, and to store the composed image data in said memory,
      said two-dimensional acceleration unit generating graphics objects to be inserted into the one or more graphics planes,
      an output interface for extracting the composed image data from said memory for display on an image display,
      a video synchronization generator for delivering vertical synchronization signals at regular intervals, and during certain of these intervals, said two-dimensional acceleration unit composes an image to be displayed based upon composition instructions, and
      said two-dimensional acceleration unit generating the graphics objects in accordance with a list of application instructions, and in that within an interval an image composition task has priority over a graphics object generation task.

31. A device according to claim 30, wherein said two-dimensional acceleration unit comprises a controller for triggering the image composition task on the occurrence of a vertical synchronization signal, then to trigger the graphics object generation task or to authorize resumption of the graphics object generation task interrupted during an occurrence of the vertical synchronization signal.

32. A device according to claim 30, wherein said processing unit, said two-dimensional acceleration unit and said output interface are on a substrate so that said component is configured as an integrated circuit.

33. A video decoder comprising:
a memory for storing video and graphics data; and
a component coupled to said memory, said component comprising
  a processing unit,
  an acceleration unit cooperating with said processing unit and said memory to compose in real time image data comprising one or more video planes and without a graphics plane, and alternatively to compose in real time other image data comprising one or more video planes and one or more graphics planes, and to store the composed image data in said memory,
  a video synchronization generator for delivering vertical synchronization signals at regular intervals, and during certain of these intervals,
  said acceleration unit generating graphics objects to be inserted into the one or more graphics planes, composing an image to be displayed based upon composition instructions, and generating the graphics objects in accordance with a list of application instructions, and in that within an interval an image composition task has priority over a graphics object generation task, and
  an output interface for extracting the composed image data from said memory for displaying on a display.

34. A video decoder according to claim 33, wherein said acceleration unit comprises a controller for triggering the image composition task on the occurrence of a vertical synchronization signal, then to trigger the graphics object generation task or to authorize resumption of the graphics object generation task interrupted during an occurrence of the vertical synchronization signal.

* * * * *

UNITED STATES PATENT AND TRADEMARK OFFICE
CERTIFICATE OF CORRECTION

PATENT NO. : 7,474,311 B2
APPLICATION NO. : 10/924748
DATED : January 6, 2009
INVENTOR(S) : Chiaruzzi et al.

It is certified that error appears in the above-identified patent and that said Letters Patent is hereby corrected as shown below:

In the Drawings

Delete: FIG. 3
Insert: New FIG. 3

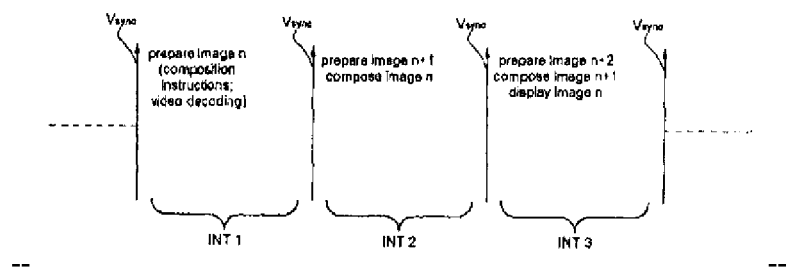

--  --

Figure 10:
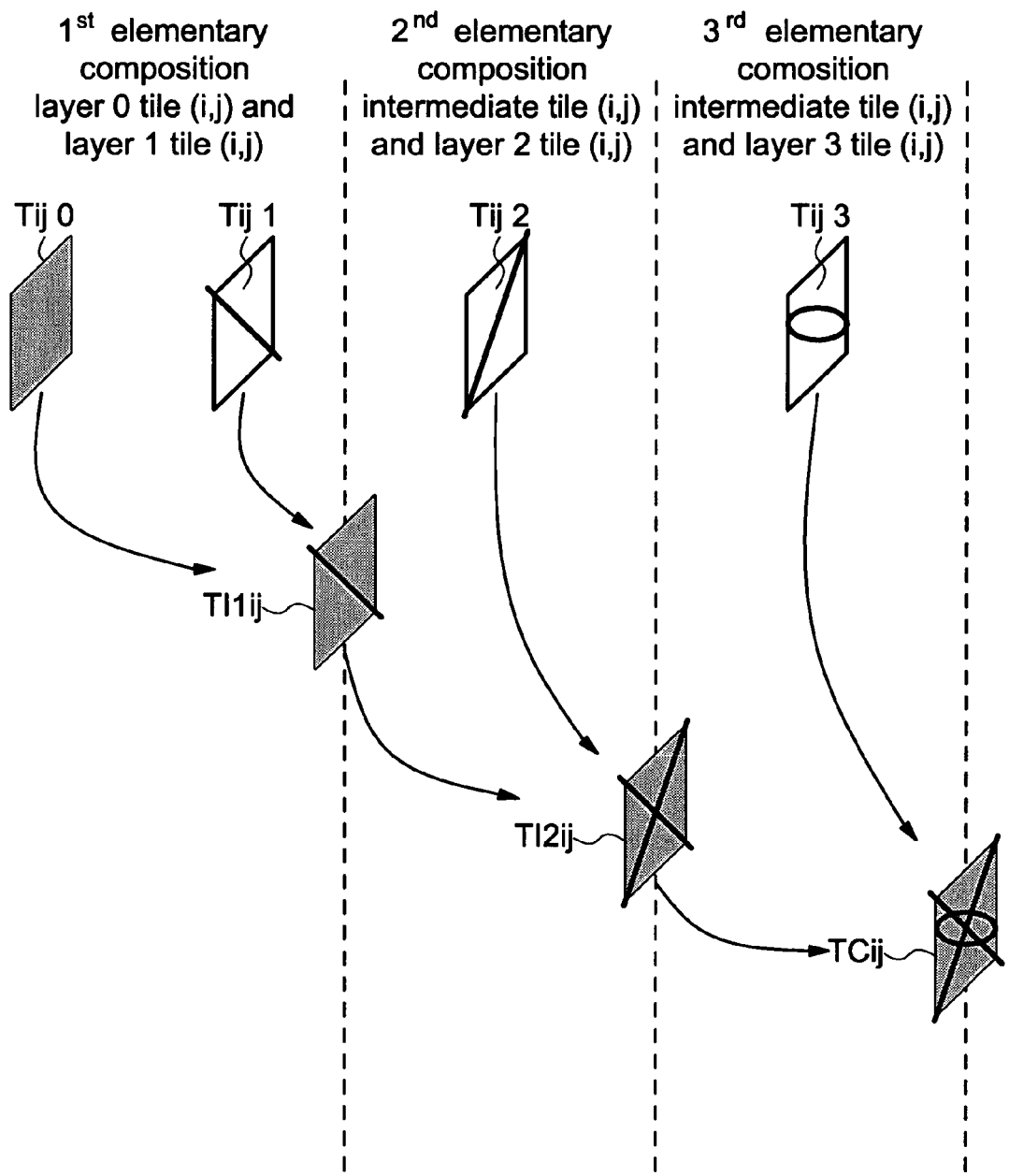

Delete: Fig. 10
Insert: New Fig. 10

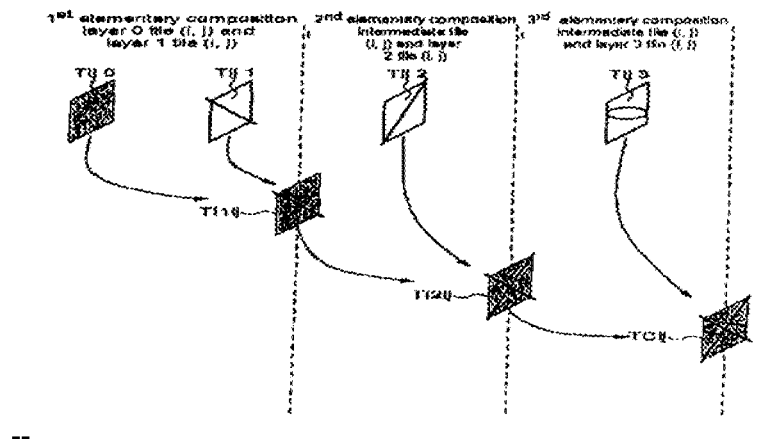

--  --

Column 4, Line 20   Delete: "According this"
Insert: --According to this--

Column 4, Line 60   Delete: "to displayed"
Insert: --to be displayed--

Column 7, Line 2    Delete: "V22"
Insert: --VT2--

UNITED STATES PATENT AND TRADEMARK OFFICE
CERTIFICATE OF CORRECTION

PATENT NO.         : 7,474,311 B2
APPLICATION NO.    : 10/924748
DATED              : January 6, 2009
INVENTOR(S)        : Chiaruzzi et al.

Page 2 of 2

It is certified that error appears in the above-identified patent and that said Letters Patent is hereby corrected as shown below:

Column 7, Line 13      Delete: "αdesignates"
                       Insert: --α designates--

Column 7, Line 25      Delete: "αxRGB"
                       Insert: --αRGB--

Column 11, Claim 12,   Delete: "p1anes"
Line 63                Insert: --planes--

Signed and Sealed this

Fifteenth Day of September, 2009

David J. Kappos
*Director of the United States Patent and Trademark Office*